July 30, 1929.  P. BILZ  1,722,622
JUNCTION BOX FOR ELECTRIC FIXTURES
Filed Jan. 26, 1923
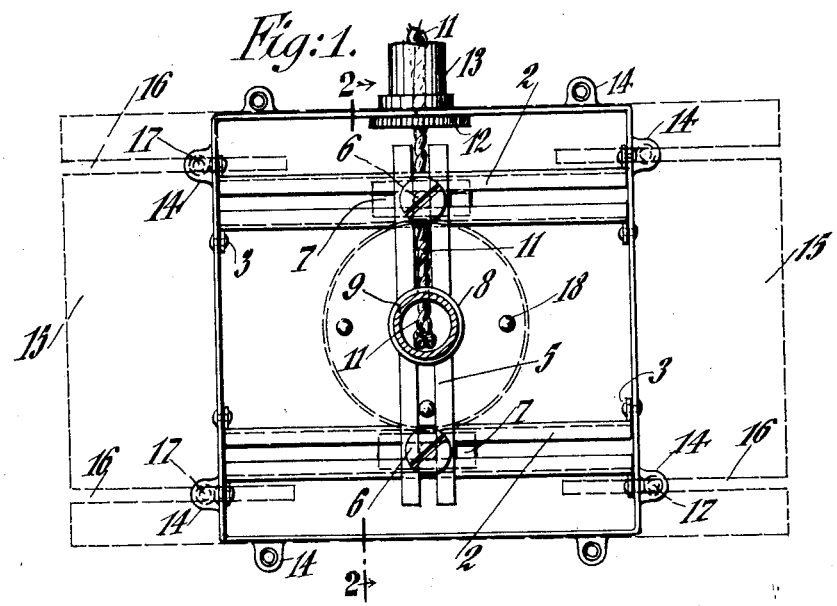
INVENTOR
Peter Bilz
BY C. P. Goepel
ATTORNEY.

Patented July 30, 1929.

1,722,622

UNITED STATES PATENT OFFICE.

PETER BILZ, OF NEW YORK, N. Y.

JUNCTION BOX FOR ELECTRIC FIXTURES.

Application filed January 26, 1923. Serial No. 614,963.

This invention relates to junction boxes placed within an opening formed in a wall of a building to make a connection between electric conductors or supply wires and a lighting fixture.

The openings in the wall of a building designed to receive a junction box are made in the rough, and located as near the desired position as can be determined when that part of the wall is under construction. When a finishing coat, or paneling, is applied to the wall it frequently happens that the point in the wall, or in the panel, where it is desired to locate a fixture is not in proper alignment with the fixture stud junction box placed in the wall. In such cases with the non-adjustable fixture studs now in use it is necessary to enlarge or change the aperture in the wall in respect of its vertical or lateral dimensions, or both, and that results in considerable expense and delay, and does not in the end produce a satisfactory arrangement of the parts.

This invention, therefore, is designed to overcome the defects and disadvantages resulting from an immovable fixture stud, and to that end a junction box is herein provided having a fixture stud that can be adjusted vertically or laterally of the interior of the box, so as to enable a fixture to be placed at any predetermined point in a finished wall or panel and connected with the junction box without changing or adjusting the position of the box in the wall.

A further object of the invention is, to provide a device of the general character last mentioned, adapted to be used with either a fixture stud or with a switch plate.

The foregoing and other objects are accomplished by the means herein stated, and illustrated in the accompanying drawings showing one embodiment of the invention, but it is to be understood that changes and modifications may be made therein without departing from the invention.

In the drawings, wherein similar reference numerals designate corresponding parts throughout the several views:

Fig. 1 is a plan of a junction box provided with an adjustable fixture stud embodying my invention, the cover of the box being indicated in dotted lines;

Fig. 2 is a transverse section of the parts shown in Fig. 1, taken on the line 2—2 thereof;

Fig. 3 is a plan of a junction box, and adjustable cover, embodying my invention, and adapted to be used in connection with an electric switch.

As illustrated in the drawings, 1 represents a junction box having primary guide ways 2 arranged in pairs, and extended longitudinally of the box. The guide ways may be of any suitable construction, but preferably angular in cross-section, with the ends thereof offset, so as to enable an aperture to be formed therein to engage a stud 3, connecting the ends of said guide ways with a wall of the junction box.

A fixture stud 4 is arranged within the box and provided with secondary guide ways 5 extending over and transversely of the primary guide ways 2. A screw stud 6 engages both the primary and secondary guide ways and is connected with a nut or head 7, by means of which the secondary guide ways 5 and fixture stud 4 may be adjusted either vertically or laterally of the box or slotted bar and be firmly secured in position, when the fixture stud is properly located.

As shown in Fig. 2, the fixture stud is provided with a thread that engages a corresponding thread on one end of a sleeve 8, said sleeve having a threaded engagement at its opposite end with a fixture stem 9. The sleeve 8 is provided with an aperture 10 to receive the supply wires 11 which enter the junction box through a coupling 12 and a conduit 13.

The junction box is preferably provided with lugs 14 on the sides and ends of the box so as to hold a cover in position, and permit the cover to be extended either lengthwise or crosswise of the box, when desired. The cover 15 is provided on its opposite ends with slots 16 that engage screws or studs 17 by means of which the ends of the cover are secured to the lugs 14.

The cover is made longer than the longitudinal or transverse dimensions of the box, so that when the box is placed in the rough opening of a wall of a building the box may be adjusted bodily relatively to the opening in the wall.

When the box has been placed in its position in the wall, the face of the cover will be in alignment with the rough wall, or coacting thereof. The cover is preferably flared outwardly at its center, as shown in Fig. 2, and the outer margin of the flared out portion is arranged in line with the finished wall, which may be of plaster or wood. If necessary, to bring the box into such position relative to the surface of the wall, filling material may be used between the back of the box and the wall, into which it is recessed, and the box then secured to the back wall by means of bolts or nails passing through apertures 18 in the bottom of the box.

When the junction box has been located properly in the wall opening and adjusted relatively to the walls of said opening and the surface of the wall, the cover is adjusted on the box, so that one end of the cover will close one side of the opening in the wall, and in such case the other end of the cover may lap over or extend beyond the opposite end of the opening; in which case the over-lapping part of the cover may be cut off by means of a saw, or otherwise, and the cover will then close the opening in the wall evenly, although the junction box is not evenly placed within the opening or recess of the wall.

After the parts are arranged in the manner described, a canopy 19 may be placed over the fixture stem 9, so as to cover the joint between the finished wall and the flared front of the top of said box, and a lamp 20 may be connected with the fixture stem 9, as indicated in Fig. 2.

Where the junction box is intended to receive an electric switch, the fixture stud and its adjustable connections are dispensed with; but the adjustable cover is used as illustrated in Fig. 3, wherein the opening 21 is defined by marginal flanges 22 and 23 upon which the switch plate may be mounted and secured.

By means of such construction, a junction box is provided which may be adjusted bodily as a unit, in the first instance, relative to the rough aperture formed in the wall therefor, and at the same time enable said opening to be covered by a face plate that will be coextensive with the opening in the wall.

Such construction, moreover, provides for a secondary and more important adjustment of a fixture stud relative to a predetermined point in the wall, or panel, where it is desired to locate a lamp bracket; and the means shown and described enable that to be readily done, even when considerable adjustment is required to bring the fixture stud into proper alignment with the predetermined spot on a wall or panel. Such means, moreover, avoid considerable labor and expense now required in changing the opening in the wall after the wall has been partly or wholly finished, and the loss of time and annoyance occasioned thereby.

What I claim as new and desire to secure by Letters Patent is:

1. In a junction box for electric fixtures, the combination of oppositely disposed primary guideways, a fixture stud, secondary guideways connected with said stud and extending transversely of the primary guideways, means adjustably securing the secondary to the primary guideways, and a cover provided with an opening opposite said fixture stud, and with slots formed in the ends of said cover engaging retaining means connected with said box, said cover being greater in length than the corresponding dimension of said box.

2. In a junction box for electric fixtures, the combination of oppositely disposed primary guideways, secondary guideways extending transversely of the primary guideways, a fixture stud mounted on said secondary guideways, means adjustably securing the secondary guideways to the primary guideways, and a cover having a central opening and means providing for adjustment of said cover on said box.

3. A junction box, having a guideway extending in one direction, a fixture stud having a guideway in the form of a slotted bar extending transversely of the first mentioned guideway, and means for securing said guideways together so that said stud and said bar can be adjustable both along said first mentioned guideway and transversely of the same.

In testimony that I claim the foregoing as my invention, I have signed my name hereunder.

PETER BILZ.